United States Patent
Shiba (10) Patent No.: US 11,334,140 B2
(45) Date of Patent: May 17, 2022

(54) ELECTRONIC DEVICE AND A CONTROL METHOD FOR OPERATING WITH EXTERNAL POWER SUPPLIES HAVING DIFFERENT POWER SUPPLY CAPABILILTIES

(71) Applicant: CANON KABUSHIKI KAISHA, Tokyo (JP)

(72) Inventor: Hidenori Shiba, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/726,591

(22) Filed: Dec. 24, 2019

(65) Prior Publication Data

US 2020/0209941 A1    Jul. 2, 2020

(30) Foreign Application Priority Data

Dec. 27, 2018   (JP) .............................. JP2018-245373

(51) Int. Cl.
| | |
|---|---|
| *G06F 1/32* | (2019.01) |
| *G06F 1/3212* | (2019.01) |
| *H02J 7/00* | (2006.01) |
| *G06F 1/3296* | (2019.01) |
| *G06F 1/28* | (2006.01) |

(52) U.S. Cl.
CPC .............. *G06F 1/3212* (2013.01); *G06F 1/28* (2013.01); *G06F 1/3296* (2013.01); *H02J 7/0048* (2020.01)

(58) Field of Classification Search
None
See application file for complete search history.

(56) References Cited

U.S. PATENT DOCUMENTS

| | | | |
|---|---|---|---|
| 8,970,165 B2 | 3/2015 | Wada et al. | |
| 10,372,568 B2 | 8/2019 | Degura et al. | |
| 2003/0163614 A1* | 8/2003 | Yoshida | .................. G06F 1/266 |
| | | | 710/16 |
| 2013/0154547 A1 | 6/2013 | Wada et al. | |
| 2013/0182178 A1* | 7/2013 | Shioji | ................ H04N 5/23241 |
| | | | 348/372 |
| 2013/0198535 A1* | 8/2013 | Takashima | .............. G06F 1/266 |
| | | | 713/300 |
| 2013/0254580 A1* | 9/2013 | Yan | .......................... G06F 1/266 |
| | | | 713/340 |
| 2017/0179734 A1 | 6/2017 | Shiba | |
| 2018/0024899 A1 | 1/2018 | Degura et al. | |
| 2018/0307290 A1* | 10/2018 | Montero | ................ G06F 1/3212 |

FOREIGN PATENT DOCUMENTS

| | | |
|---|---|---|
| JP | 2013-109410 A | 6/2013 |
| JP | 2017-112811 A | 6/2017 |
| JP | 2018-013932 A | 1/2018 |

* cited by examiner

*Primary Examiner* — Danny Chan
(74) *Attorney, Agent, or Firm* — Cowan, Liebowitz & Latman, P.C.

(57) ABSTRACT

An electronic device includes a determination unit that determines whether or not an operation of the electronic device can be maintained, based on power supplied from an external device to the electronic device and power supplied from a battery, in a case the power supplied from the external device to the electronic device changes, and a notification unit that notifies information corresponding to a result of the determination.

17 Claims, 8 Drawing Sheets

FIG. 2

| CHARGE STATE | NOT FULLY CHARGED | | FULLY CHARGED | |
|---|---|---|---|---|
| POWER SUPPLY CAPABILITY \ OPERATION MODE | STILL IMAGE MODE | MOVING IMAGE MODE | STILL IMAGE MODE | MOVING IMAGE MODE |
| 27W(9V@3A) | POWER SUPPLY + CHARGE | | POWER SUPPLY | |
| 15W(5V@3A) | | | | |
| 7.5W(5V@1.5A) | POWER SUPPLY | POWER SUPPLY + DISCHARGE | | POWER SUPPLY + DISCHARGE |
| NO SOURCE DEVICE | DISCHARGE | | DISCHARGE | |

ELECTRONIC DEVICE AND A CONTROL METHOD FOR OPERATING WITH EXTERNAL POWER SUPPLIES HAVING DIFFERENT POWER SUPPLY CAPABILILTIES

BACKGROUND

Field of the Disclosure

Aspects of the disclosure generally relate to an electronic device capable of receiving power supplied from an external device, and a control method.

Description of the Related Art

A device that is compliant with a USB (Universal Serial Bus) PD (Power Delivery) standard can supply more power via USB than the USB 2.0 standard.

In the USB PD standard, supply of up to 100 W (20V@5A) is possible, but a source device for supplying power does not have to be able to supply up to 100 W (20V@5A). However, a source device capable of supplying power according to a certain power supply capability is required to be capable of supplying power according to a power supply capability lower than this power supply capability. For example, a source device capable of supplying power according to a power supply capability of 27V (9V@3A) needs to be capable of supplying power according to a power supply capability of 27 W or less. Power supply capability of 27 W or less include 27 W (9V@3A), 15 W (5V@3A), and 7.5 W (5V@5A).

A source device capable of supplying power according to a 27V power supply capability may change the 27 W power supply capability to a power supply capability of less than 27 W (for example, a 15 W power supply capability) when the source device is operating at a 27 W power supply capability. Conversely, when the source device is operating at a power supply capability of less than 27 W (for example, a power supply capability of 15 W), the source device may change a power supply capability of less than 27 W to a power supply capability of 27 W.

As described above, in the USB PD standard, when power is being supplied from a source device to a sink device, it is assumed that the power being supplied from the source device to the sink device is changed.

Japanese Patent Laid-Open No. 2013-109410 describes an electronic device for determining a type of a charger and charging a battery with a charging current according to the type of the charger.

The USB PD standard has the following problems. For example, in an electronic device that has a battery, a state in which the electronic device is operated while the battery is charged with power supplied from an external device is assumed. In such a state, when the supplied power is lowered, power from the battery is used when only the power supplied from the external device is insufficient for the operation of the electronic device. However, if the battery is not sufficiently charged, there may be cases in which the operation of the electronic device is going to be unavailable when power supplied from the external device is lowered.

SUMMARY

According to an aspect of the embodiments, an electronic device that receives power supplied from an external device to the electronic device is improved or facilitated.

According to an aspect of the embodiments, there is provided an electronic device comprising: a determination unit that determines whether or not an operation of the electronic device can be maintained, based on power supplied from an external device to the electronic device and power supplied from a battery, in a case the power supplied from the external device to the electronic device changes; and a notification unit that notifies information corresponding to a result of the determination.

According to an aspect of the embodiments, there is provided a method comprising: determining whether or not an operation of an electronic device can be maintained, based on power supplied from an external device to the electronic device and power supplied from a battery, in a case the power supplied from the external device to the electronic device changes; and notifying information corresponding to a result of the determination.

According to an aspect of the embodiments, there is provided a non-transitory storage medium storing a program that causes a computer to execute a method, the method comprising: determining whether or not an operation of an electronic device can be maintained, based on power supplied from an external device to the electronic device and power supplied from a battery, in a case the power supplied from the external device to the electronic device changes; and notifying information corresponding to a result of the determination.

Further aspects of the embodiments will become apparent from the following embodiments.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

In the first embodiment, an electronic device 100 that receives power supplied from a source device (corresponding to an external device) that is compliant with a USB (Universal Serial Bus) PD (Power Delivery) standard will be described. As described below, the electronic device 100 according to the first embodiment can supply power to components of the electronic device 100 using power received from the source device, and can charge a battery 106 using the power received from the source device.

Under the USB PD standard, a source device that supplies power to the electronic device 100 can supply power according to a predetermined power supply capability (one of 7.5 W (5V@1.5 Å), 15 W (5V@3 Å), or 27 W (9V@3 Å)).

After the source device has supplied power to the electronic device 100, the source device can reduce power supplied to the electronic device 100 in a case such as where power supplied to the electronic device 100 cannot be maintained. For example, although the source device supplies 27 W (9V@3 Å) of power to the electronic device 100 at a time of starting the supply of power, there are cases where the source device cannot maintain power supply at 27 W (9V@3 Å). In such a case, the source device can notify the electronic device 100 of a change to power of 15 W (5V@3 Å), and then change the power supplied to the electronic device 100.

Figure 1:
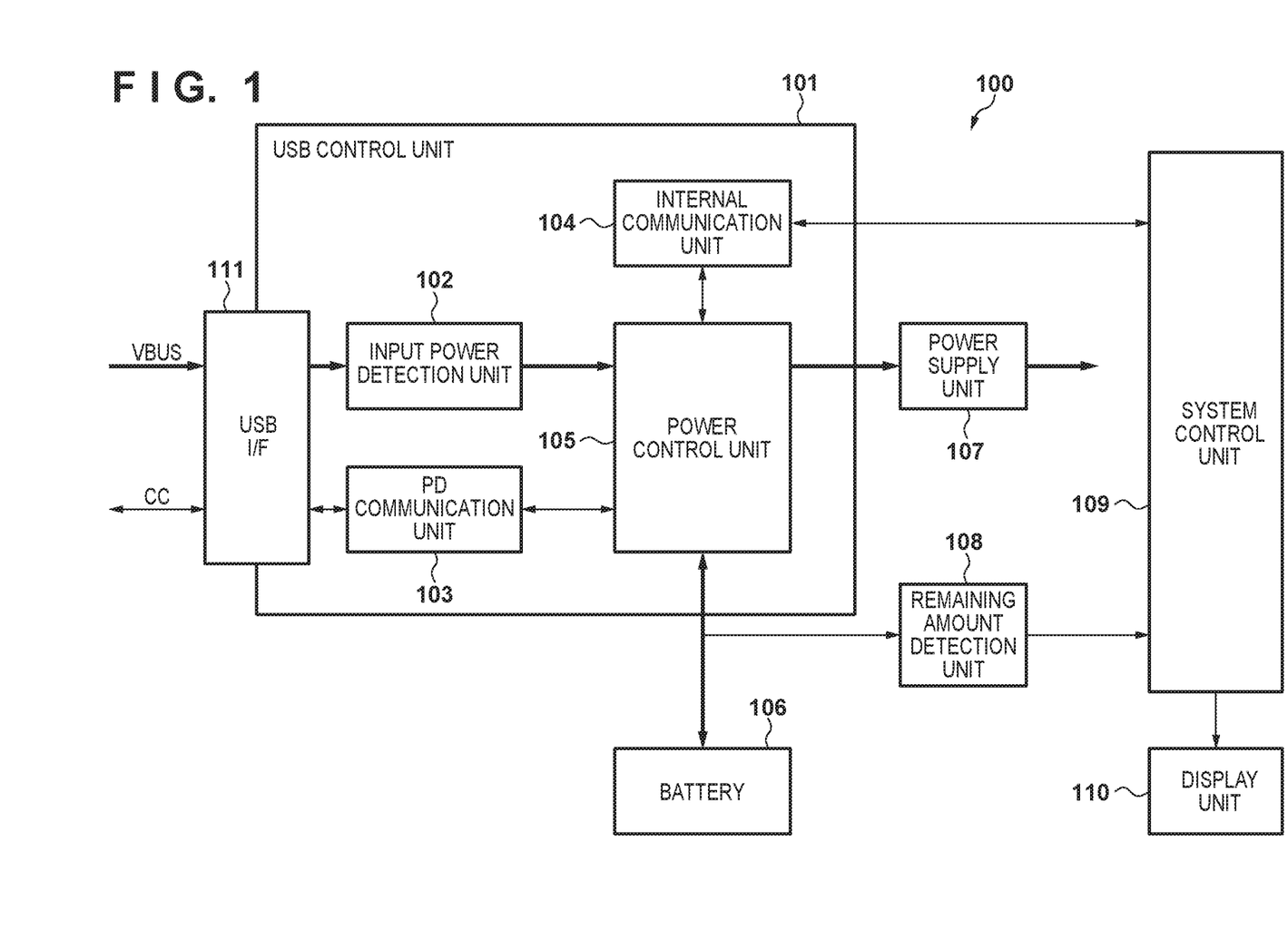
FIG. 1 is a block diagram illustrating an example of components of an electronic device 100 according to a first embodiment.

Hereinafter, an example of components of the electronic device 100 according to the first embodiment will be described with reference to FIG. 1. However, the component of the electronic device 100 are not limited to the components illustrated in FIG. 1.

The electronic device 100 is a sink device that supports the USB PD standard. The electronic device 100 can also act as a digital camera, a mobile phone (for example: a smart phone), or a mobile terminal (for example: a tablet terminal), or at least one of these.

A USB control unit 101 is configured as a dedicated hardware processor, for example, and, if a device that supports USB PD is connected in accordance with a USB interface 111, detects that connection and performs communication control with a source device, or the like. The USB interface 111 has an VBUS terminal and a CC (Configuration Channel) terminal. The VBUS terminal is a terminal for receiving power supply from a source device. The CC terminal is a terminal for acquiring information on power supply capability of the source device.

The USB control unit 101 includes an input power detection unit 102, a PD communication unit 103, an internal communication unit 104, and a power control unit 105.

The input power detection unit 102 detects a VBUS voltage (a voltage of the VBUS terminal) and power that is supplied from the source device to the electronic device 100.

The PD communication unit 103 performs communication that is compliant with the USB PD standard with the source device via the USB interface 111.

The internal communication unit 104 performs a communication inside the device with a system control unit 109 that controls the components of the electronic device 100.

The power control unit 105 is connected to the input power detection unit 102, the PD communication unit 103, and the internal communication unit 104. The power control unit 105 controls charging of the battery 106, and controls supply of power to the components of the electronic device 100.

Battery 106 is a rechargeable battery, such as a lithium ion battery, and can be removed from the electronic device 100. The battery 106 is connected to the USB control unit 101 and supplies power for causing the components of the electronic device 100 to operate.

A power supply unit 107 is connected to the USB control unit 101. The power supply unit 107 converts power supplied from the power control unit 105 into a voltage necessary for the components of the electronic device 100, and power resulting from this conversion is supplied to the components.

A remaining amount detection unit 108 is connected to the battery 106 and detects a remaining amount of the battery 106.

The system control unit 109 includes a processor (for example: a hardware processor) that controls the components of the electronic device 100. The system control unit 109 can control various processes to be described later by executing a program stored in a memory (not illustrated). Note that the system control unit 109 is connected to the internal communication unit 104 and the remaining amount detection unit 108 of the USB control unit 101.

A display unit 110 displays a GUI (Graphical User Interface such as characters, graphics, and symbols for interactive operation, and displays images. The display unit 110 is, for example, a display device such as a liquid crystal display or an organic EL display. Configuration may be such that the display unit 110 is integrated with the electronic device 100 or is an external device connected to the electronic device 100. The electronic device 100 may be connected to the display unit 110 and may have a function of controlling display of the display unit 110. The display unit 110 is connected to the system control unit 109, and the system control unit 109 controls display of the display unit 110.

Next, an example of an operation state of the electronic device 100 will be described with reference to FIG. 2.

Hereinafter, an example of an operation state when the electronic device 100 acts as a digital camera will be described. In order to simplify the description, a case of two modes: a still image mode and a moving image mode, will be described as an example of operation modes of the electronic device 100. The moving image mode is a first operation mode that can operate with power consumption of 7.5 W or more. The still image mode is a second operation mode that can operate with power consumption of less than 7.5 W.

First, the terms written in FIG. 2 will be described.

"Discharge" indicates a state in which the electronic device 100 operates only by power of the battery 106.

"Power supply" indicates a state in which the electronic device 100 operates with only power supplied from the source device and charging of the battery 106 is not performed.

"Power supply+charge" indicates an operation state in which the electronic device 100 operates with only power from the source device and charging of the battery 106 is not performed.

"Power supply+discharge" indicates a state in which power from the source device is insufficient for the operation of the electronic device 100, and the electronic device 100 is operating by also using power from the battery 106.

Figure 2:
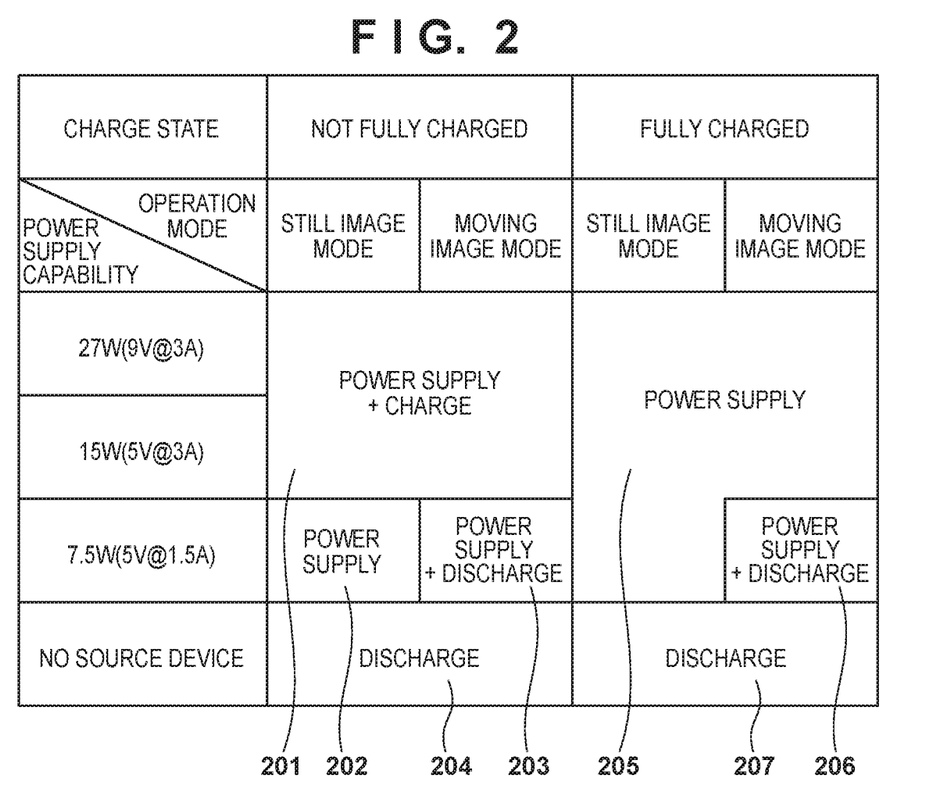
FIG. 2 is a diagram for illustrating a relationship between a power supply capability of a source device, an operation mode of the electronic device 100, and a power supply state.

Next, with reference to FIG. 2, description is given for a relationship between a power supply capability of a source device, an operation mode of the electronic device 100, and a power supply state.

In FIG. 2, a state in which charging of the battery 106 is complete and recharging is unnecessary and a remaining amount in a full state is referred to as "fully charged", and a state in which there is a remaining amount of the battery 106 and charging is available is referred to as "not fully charged".

A "power supply+charge" 201 is when the battery 106 is in a not fully charged state, the power supply capability of the source device is 27 W (9V@3 Å) or 15 W (5V@3 Å), and the operation mode of the electronic device 100 is the still image mode or the moving image mode. In this case, this is a state in which the electronic device 100 is operating while charging the battery 106.

A "power supply" 202 is when the battery 106 is in a not fully charged state, the power supply capability of the source device is 7.5 W (5V@1.5 Å), and the operation mode of the electronic device 100 is the still image mode. In this case, this is a state in which the electronic device 100 is operating from only power from the source device, without charging the battery 106.

A "power supply+discharge" 203 is when the battery 106 is in a not fully charged state, the power supply capability of the source device is 7.5 W (5V@1.5 Å), and the operation mode of the electronic device 100 is the moving image mode. In this case, this is a state in which the electronic device 100 is operating in accordance with power supplied from the source device and power output from the battery 106.

A "discharge" 204 is a case where the source device is a state of not being connected to the electronic device 100, and where the operation mode of the electronic device 100 is the still image mode or the moving image mode. In this case, this is a state in which the electronic device 100 is operating with only power outputted from the battery 106.

A "power supply" 205 is when the battery 106 is in a fully charged state, the power supply capability of the source device is 27 W (9V@3 Å) or 15 W (5V@3 Å), and the operation mode of the electronic device 100 is the still image mode or the moving image mode. In this case, this is a state in which the electronic device 100 is operating with only power supplied from the source device. Note that the "power supply" 205 includes the case where the battery 106 is in a fully charged state, the power supply capability of the source device is 7.5 W (5V@1.5 Å), and the operation mode of the electronic device 100 is the still image mode.

A "power supply+discharge" 206 is when the battery 106 is in a fully charged state, the power supply capability of the source device is 7.5 W (5V@1.5 Å), and the operation mode of the electronic device 100 is the moving image mode. In this case, this is a state in which the electronic device 100 is operating in accordance with power supplied from the source device and power output from the battery 106.

A "discharge" 207 is a case where the source device is a state of not connected to the electronic device 100, and where the operation mode of the electronic device 100 is the still image mode or the moving image mode. In this case, this is a state in which the electronic device 100 is operating with only power outputted from the battery 106.

Figure 3:
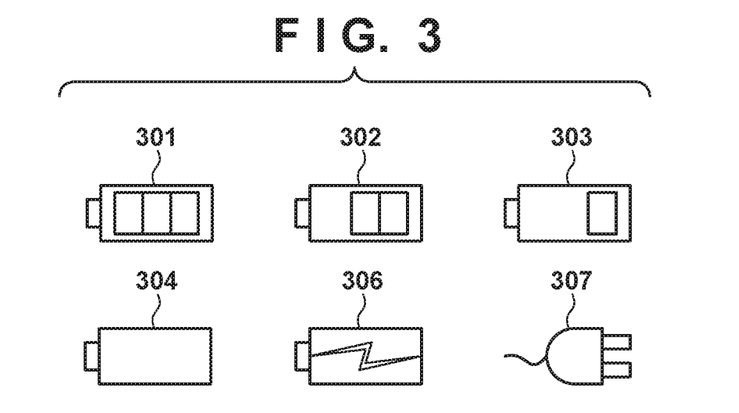
FIG. 3 is a diagram for illustrating an example of a battery remaining amount display of the electronic device 100.

Next, an example of a remaining amount display for the battery 106 of the electronic device 100 will be described with reference to FIG. 3.

A first icon 301 is displayed on the display unit 110 when the battery 106 is in the fully charged state. When the voltage of the battery 106 is greater than or equal to a threshold VHalf and the remaining amount of the battery 106 is greater than or equal to 50%, the battery 106 is determined to be in a fully charged state.

A second icon 302 is displayed on the display unit 110 when the battery 106 is in an intermediate charge state. When the voltage of the battery 106 is less than a first threshold VHalf and greater than or equal to a second threshold VWeak, and the remaining amount is 20% to 50%, the battery 106 is determined to be in the intermediate charge state.

A third icon 303 is displayed on the display unit 110 when the battery 106 is in a low charge state. When the voltage of the battery 106 is less than the second threshold VWeak and greater than or equal to a third threshold VLow, and the remaining amount is 10% to 20%, the battery 106 is determined to be in the low charge state. The third icon 303 is displayed to notify the user that the remaining amount of the battery 106 is low.

A fourth icon 304 is displayed on the display unit 110 when the battery 106 is in a no charge state. When the voltage of the battery 106 is less than or equal to the third threshold VLow and the remaining amount is less than or equal to 10%, the battery 106 is determined to be in the no charge state. The fourth icon 304 is displayed to perform a notification for prompting a user to shut down the electronic device 100 and charge the battery 106.

A fifth icon 306 is displayed on the display unit 110 when the battery 106 is charging. The fifth icon 306 is displayed to notify the user that charging is underway in a case where the battery 106 is being charged by power supplied from a source device.

A sixth icon 307 is displayed on the display unit 110 when a source device is connected to the electronic device 100. The sixth icon 307 is displayed to notify the user that a source device is connected to the electronic device 100 and power is being supplied from the source device.

Next, an example of a process performed by the electronic device 100 will be described with reference to flow charts of FIGS. 4, 5A, 5B, 6A, 6B, and 7. A process 400 indicates an example of a process in which the electronic device 100 controls power supplied from a connected device in accordance with the type of the device which is connected over USB.

Figure 4:
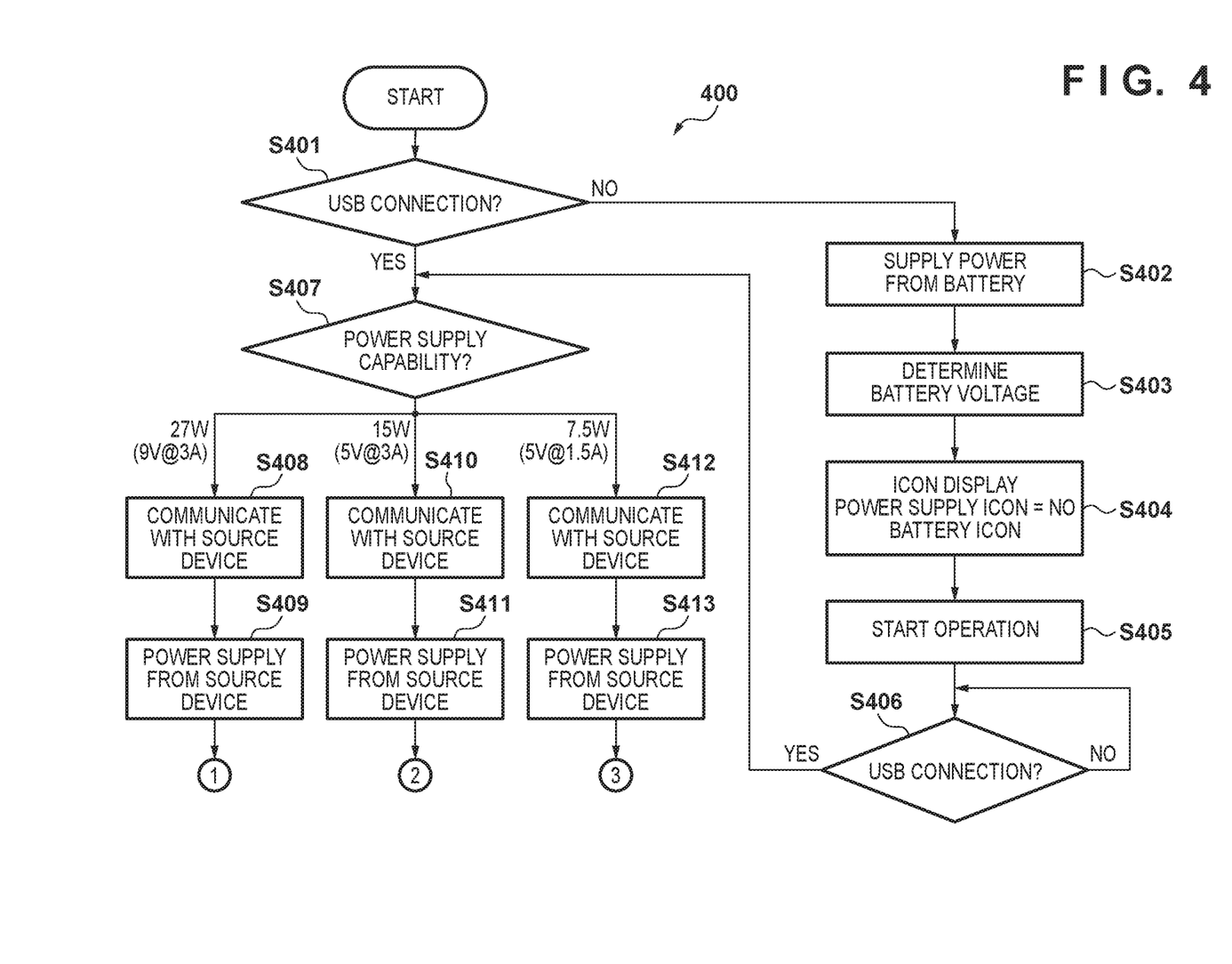
FIG. 4 is a flow chart for illustrating an example of a process performed by the electronic device 100.

In the process 400 of FIG. 4, the system control unit 109 communicates with the USB control unit 101 and controls the components of the electronic device 100 by executing a program. The process 400 is started when the source device and the electronic device 100 are connected over USB.

In step S401, the USB control unit 101 determines whether or not the source device is connected to the electronic device 100 via USB based on the voltage of a terminal connected to the PD communication unit 103 and the VBUS voltage detected by the input power detection unit 102. If the USB control unit 101 determines in step S401 that the USB control unit 101 is not connected to the source device, the process 400 proceeds to step S402.

In step S402, the USB control unit 101 performs control so as to supply power of the battery 106 to the power supply unit 107, and the process 400 proceeds to step S403.

In step S403, the system control unit 109 acquires the voltage of the battery 106 from the remaining amount detection unit 108, and compares it with the first threshold VHalf, the second threshold VWeak, and the third threshold VLow to determine the voltage of the battery 106, and the process 400 proceeds to step S404.

In step S404, the system control unit 109 displays any one of the icons 301 to 304 according to the voltage of the battery 106 determined in step S403 without displaying the sixth icon 307, and the process 400 proceeds to step S405.

In step S405, the system control unit 109 starts operation in accordance with the operation mode of the electronic device 100, and the process 400 proceeds to step S406. When the electronic device 100 acts as a digital camera, the operation mode of the electronic device 100 is a moving image mode or a still image mode.

In step S406, the USB control unit 101 determines whether or not the source device is connected to the electronic device 100 via USB based on the voltage of a terminal connected to the PD communication unit 103 and the VBUS voltage detected by the input power detection unit 102. When the USB control unit 101 determines that a source device is not connected (NO in step S406), the present operation continues, and when the USB control unit 101 determines that a source device is connected (YES in step S406), the process 400 proceeds to step S407.

If the USB control unit 101 determines in step S401 that the USB control unit 101 is connected to a source device, the process 400 proceeds to step S407.

In step S407, the USB control unit 101 performs communication with the source device in accordance with the PD communication unit 103, and acquires power supply capability information indicating the power supply capability of the source device. Then, the USB control unit 101 determines the power supply capability of the source device in accordance with the power supply capability information acquired in step S407.

If the power supply capability of the source device is 27 W (9V@3 Å), the process 400 proceeds from step S407 to step S408. If the power supply capability of the source device is 15 W (5V@3 Å), the process 400 proceeds from step S407 to step S410. If the power supply capability of the source device is 7.5 W (5V@1.5 Å), the process 400 proceeds from step S407 to step S412.

In step S408, the USB control unit 101 requests the PD communication unit 103 to supply power of 27 W (9V@3 Å) to the source device, and the process 400 proceeds to step S409.

Figure 5A:
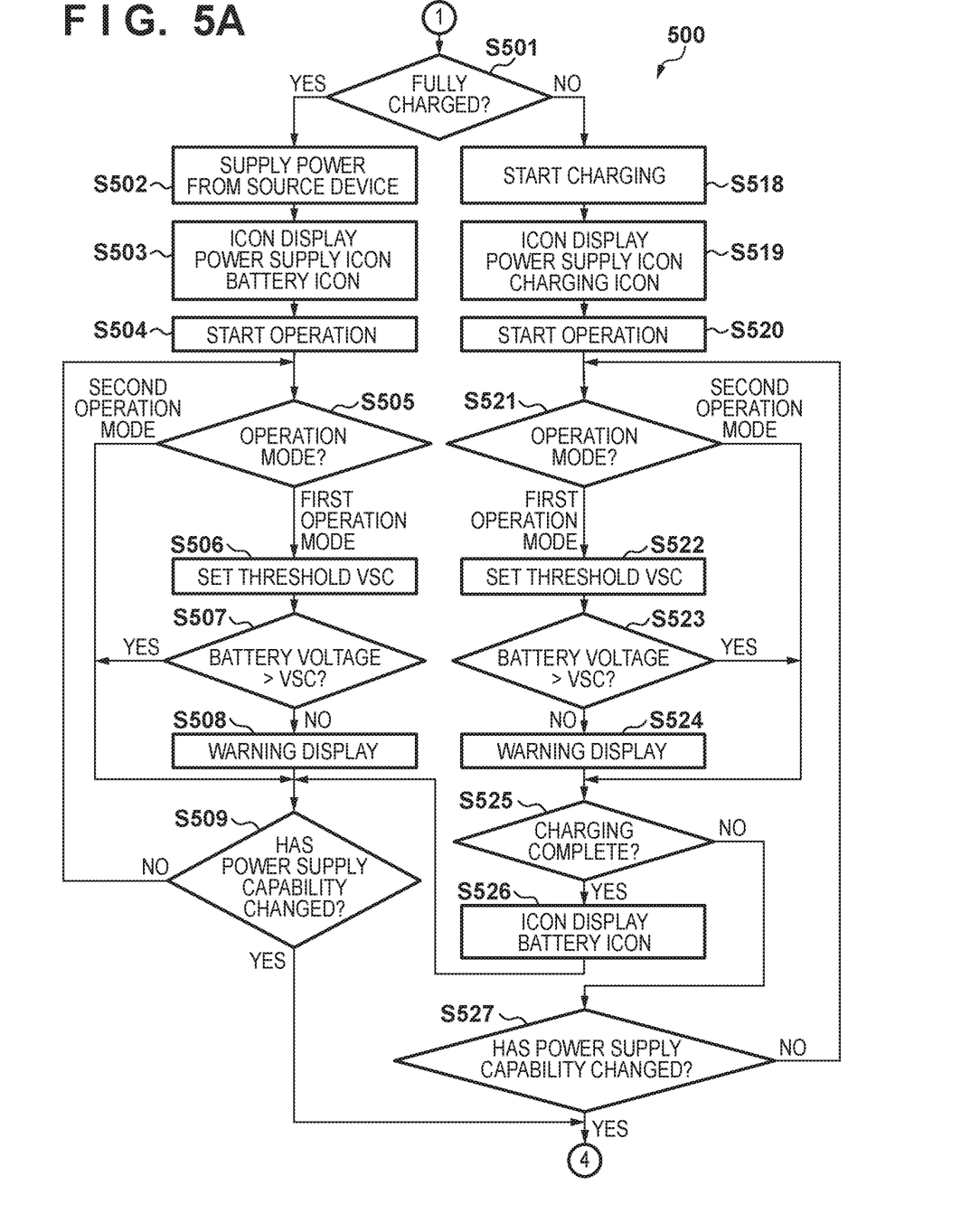
FIGS. 5A and 5B are flow charts for explaining an example of a process performed in the electronic device 100 when power supply capability of a source device is 27 W (9V@3 Å).
Figure 5B:
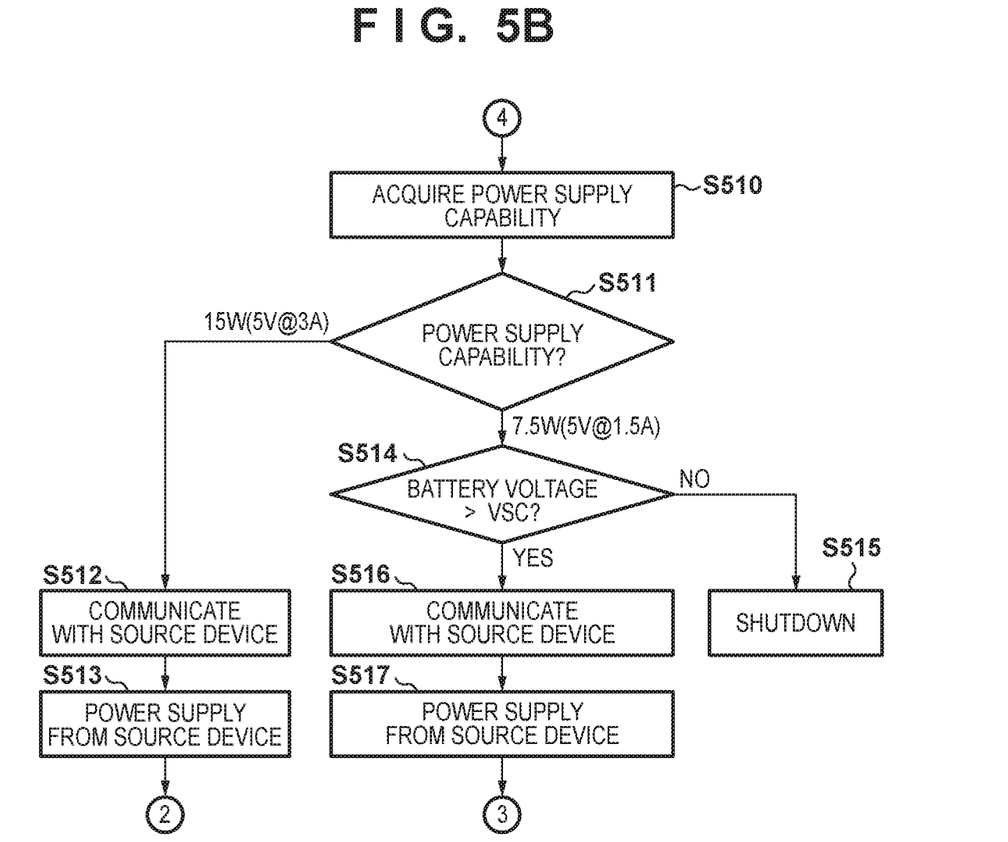

In step S409, when the USB control unit 101 receives, via the PD communication unit 103, a response from the source device indicating that the source device will start supplying power of 27 W (9V@3 Å), the USB control unit 101 confirms that power is supplied from the source device, and then a process 500 shown in FIGS. 5A and 5B will begin.

In step S410, the USB control unit 101 requests the PD communication unit 103 to supply power of 15 W (5V@3 Å) to the source device, and the process 400 proceeds to step S411.

Figure 6A:
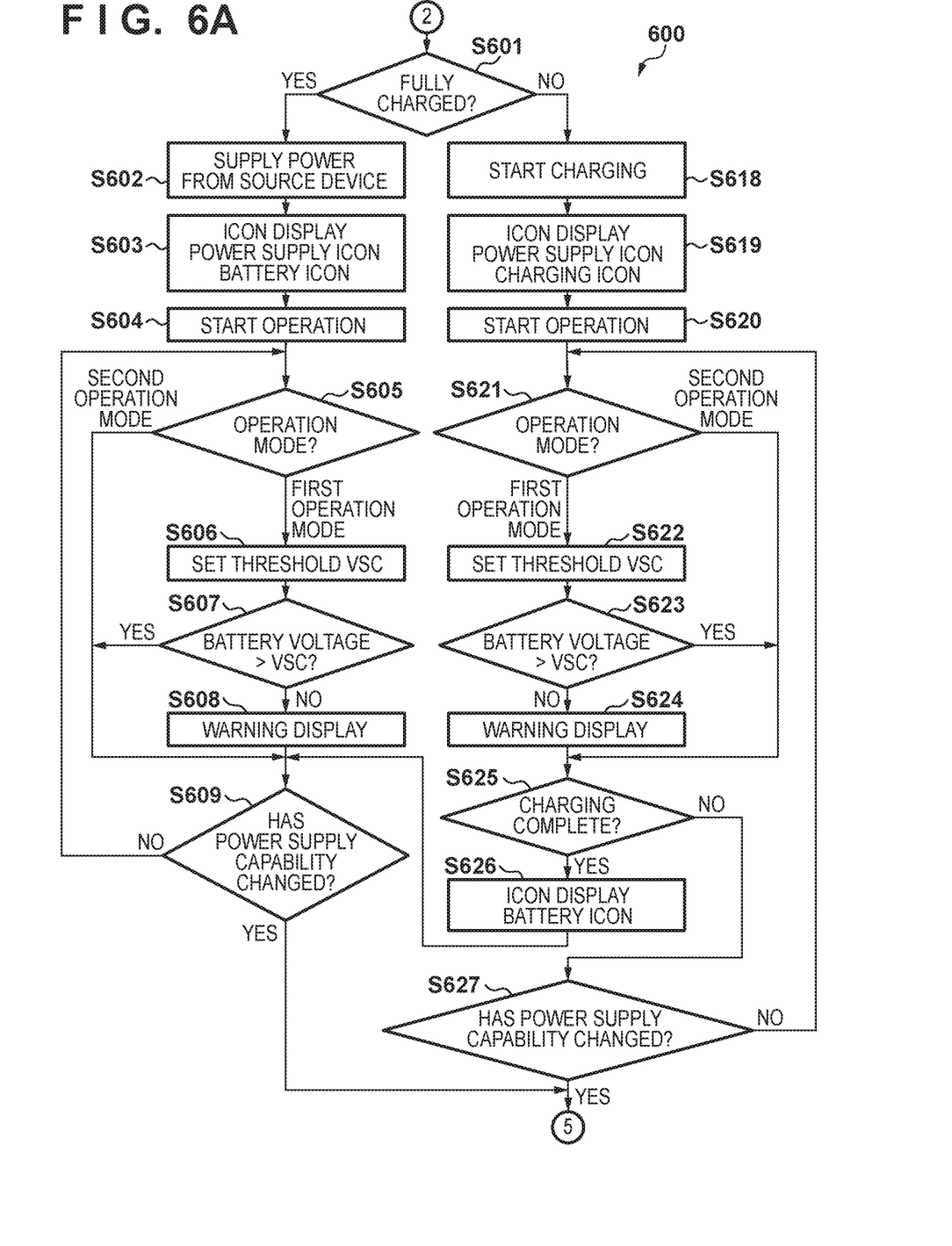
FIGS. 6A and 6B are flow charts for explaining an example of a process performed in the electronic device 100 when the power supply capability of the source device is 15 W (5V@3 Å).
Figure 6B:
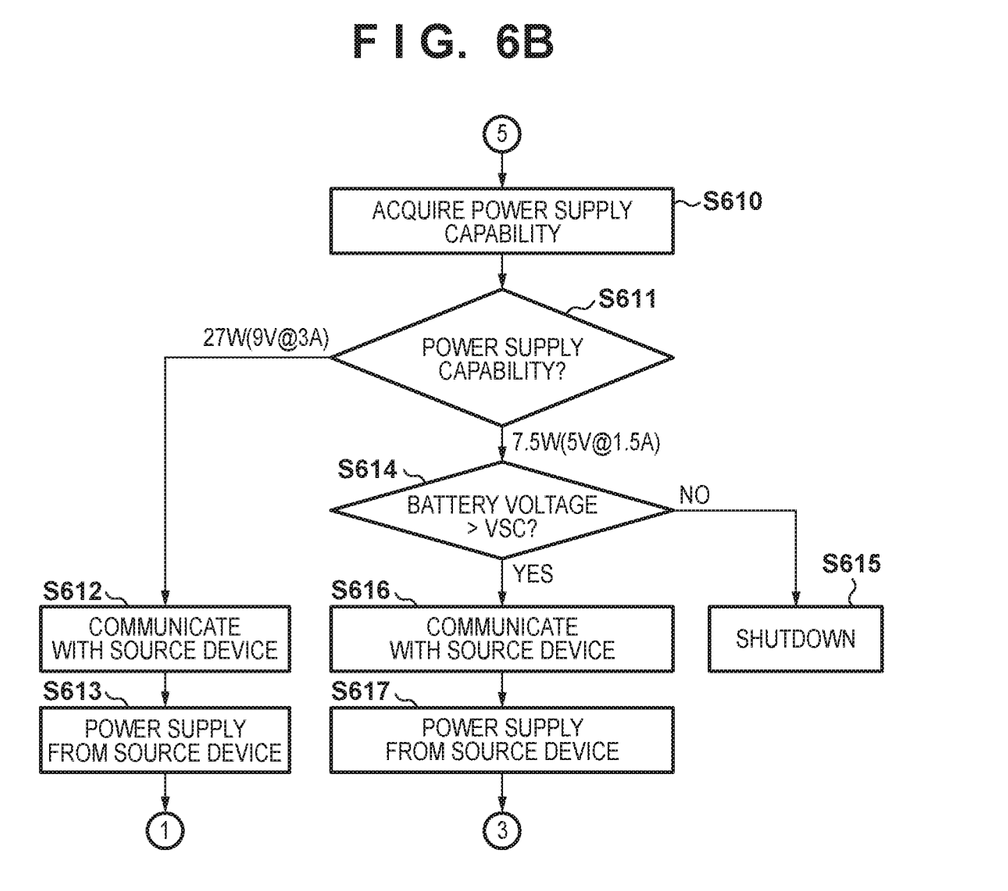

In step S411, when the USB control unit 101 receives, via the PD communication unit 103, a response from the source device indicating that the source device will start supplying power of 15 W (5V@3 Å), the USB control unit 101 confirms that power is supplied from the source device, and then a process 600 shown in FIGS. 6A and 6B will begin.

In step S412, the USB control unit 101 requests the PD communication unit 103 to supply power of 7.5 W (5V@1.5 Å) to the source device, and the process 400 proceeds to step S413.

Figure 7:
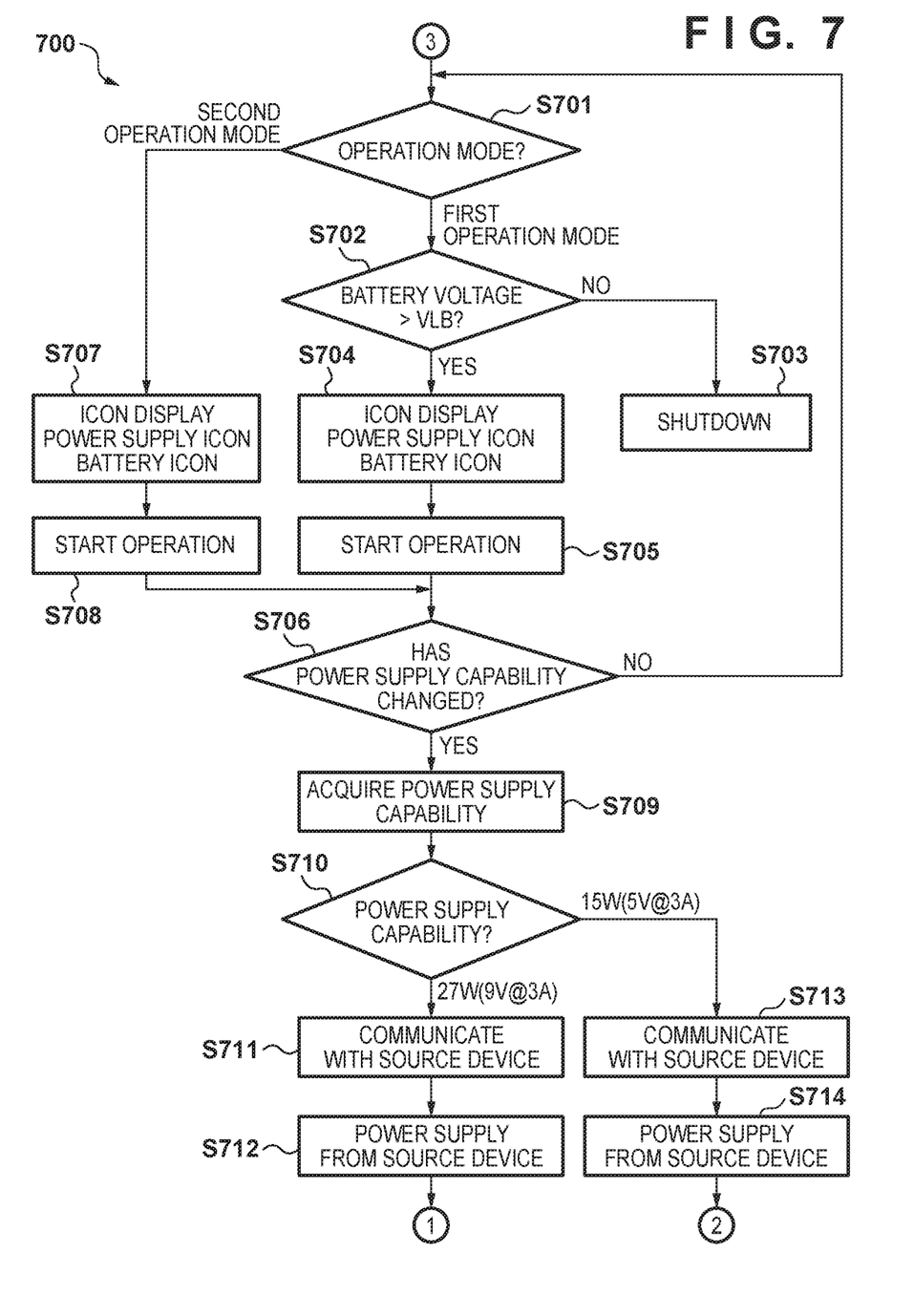
FIG. 7 is a flow chart for explaining an example of a process performed in the electronic device 100 when the power supply capability of the source device is 7.5 W (5V@1.5 Å).

In step S413, when the USB control unit 101 receives, via the PD communication unit 103, a response from the source device indicating that the source device will start supplying power of 7.5 W (5V@1.5 Å), the USB control unit 101 confirms that power is supplied from the source device, and then a process 700 shown in FIG. 7 will begin.

Next, referring to FIGS. 5A and 5B, the process 500 performed when the electronic device 100 receives power supply of 27 W (9V@3 Å) from the source device will be described.

In step S501, the system control unit 109 acquires the voltage of the battery 106 from the remaining amount detection unit 108, and compares it with the first threshold VHalf, the second threshold VWeak, and the third threshold VLow to determine whether the battery 106 is in the fully charged state. If the system control unit 109 determines in step S501 that the battery 106 is in the fully charged state (YES in step S501), the process 500 proceeds to step S502.

In step S502, the USB control unit 101 supplies power supplied from the source device to the power supply unit 107, and the process 500 proceeds to step S503.

In step S503, the system control unit 109 displays, on the display unit 110, the first icon 301 indicating the remaining battery level and the sixth icon 307 indicating a state where the source device is connected, and the process 500 proceeds to step S504.

In step S504, the system control unit 109 starts operation of the electronic device 100, and the process 500 proceeds to step S505. When the electronic device 100 acts as a digital camera, the electronic device 100 starts operation in the moving image mode or the still image mode.

In step S505, the system control unit 109 determines the operation mode of the electronic device 100, and in the case of the first operation mode, the process 500 proceeds to step S506, and in the case of the second operation mode, the process 500 proceeds to step S509. When the electronic device 100 acts as a digital camera, the first operation mode is the moving image mode and the second operation mode is the still image mode.

In step S506, the system control unit 109 sets a predetermined threshold VSC with respect to the voltage of the battery 106 detected by the remaining amount detection unit 108, and the process 500 proceeds to step S507. When the electronic device 100 is in the "power supply+discharge" state, the value of the predetermined threshold VSC is a value at which the operation of the electronic device 100 cannot be maintained when the voltage of the battery 106 falls below the predetermined threshold VSC.

In step S507, the system control unit 109 compares the voltage of the battery 106 acquired from the remaining amount detection unit 108 with the predetermined threshold VSC. In step S507, if the voltage of the battery 106 is greater than the predetermined threshold VSC, the process 500 proceeds to step S509, and if the voltage is less than or equal to the predetermined threshold VSC, the process 500 proceeds to step S508.

In step S508, the system control unit 109 performs a warning display, and the process 500 proceeds to step S509. In the warning display, a message or the like is displayed on the display unit 110 to notify the user that, if the power supplied from the source device is changed to 7.5 W (5V@1.5 Å), the moving image mode currently in operation is going to be unavailable and the operation will end.

In step S509, the power control unit 105 determines whether or not the PD communication unit 103 has received a change notification indicating a change in the power supply capability of the source device from the source device. In step S509, when the power control unit 105 has received a change notification from the source device (YES in step S509), the process 500 proceeds to step S510, and when the power control unit 105 has not received a change notification (NO in step S509), the process 500 proceeds to step S505.

In step S510, the USB control unit 101 performs communication with the source device in accordance with the PD communication unit 103, and acquires power supply capability information indicating the power supply capability of the source device, and the process 500 proceeds to step S511.

In step S511 the USB control unit 101 determines the power supply capability of the source device in accordance with the power supply capability information acquired in step S510. If the power supply capability of the source device is 15 W (5V@3 Å), the process 500 proceeds to step S512. If the power supply capability of the source device is 7.5 W (5V@1.5 Å), the process 500 proceeds to step S514.

In step S512, the USB control unit 101 requests the PD communication unit 103 to supply power of 15 W (5V@3 Å) to the source device, and the process 500 proceeds to step S513.

In step S513, when the USB control unit 101 receives, via the PD communication unit 103, a response from the source device indicating that the source device will start supplying power of 15 W (5V@3 Å), the USB control unit 101 confirms that power is supplied from the source device, and then the process 600 shown in FIGS. 6A and 6B will begin.

In step S514, the system control unit 109 compares the voltage of the battery 106 acquired from the remaining amount detection unit 108 with the predetermined threshold VSC. In step S514, if the voltage of the battery 106 is greater than the predetermined threshold VSC (YES in step S514), the process 500 proceeds to step S516, and if the voltage is equal to or lower than the predetermined threshold VSC (NO in step S514), the process 500 proceeds to step S515.

In step S515, the system control unit 109 performs a process to shutdown the electronic device 100, and displays the fourth icon 304 on the display unit 110. Note that charging of the battery 106 may be performed after the shutdown in step S515.

In step S516, the USB control unit 101 requests the PD communication unit 103 to supply power of 7.5 W (5V@1.5 Å) to the source device, and the process 500 proceeds to step S517.

In step S517, when the USB control unit 101 receives, via the PD communication unit 103, a response from the source device indicating that the source device will start supplying power of 7.5 W (5V@1.5 Å), the USB control unit 101 confirms that power is supplied from the source device, and then the process 700 shown in FIG. 7 will begin.

If the system control unit 109 determines in step S501 that the battery 106 is not in the fully charged state (NO in step S501), the process 500 proceeds to step S518.

In step S518, the system control unit 109 communicates with the internal communication unit 104, and performs a setting for charging the battery 106 with respect to the USB control unit 101. The USB control unit 101 starts to charge the battery 106, and the process 500 proceeds to step S519.

In step S519, the USB control unit 101 splits power supplied from the source device into power to be supplied to the power supply unit 107 and power for charging the battery 106, and supplies these power to the power supply unit 107 and battery 106.

Normally, the USB control unit 101 performs control to prioritize power supply to the power supply unit 107, and charge the battery 106 with remaining surplus power.

In step S519, the system control unit 109 displays, on the display unit 110, the fifth icon 306 indicating that charging of the battery is underway and the sixth icon 307 indicating a state where the source device is connected, and the process 500 proceeds to step S520.

In step S520, the system control unit 109 starts operation of the electronic device 100, and the process 500 proceeds to step S521. When the electronic device 100 acts as a digital camera, the electronic device 100 starts operation in the moving image mode or the still image mode.

In step S521, the system control unit 109 determines the operation mode of the electronic device 100, and in the case of the first operation mode, the process 500 proceeds to step S522, and in the case of the second operation mode, the process 500 proceeds to step S525. When the electronic device 100 acts as a digital camera, the first operation mode is the moving image mode and the second operation mode is the still image mode.

In step S522, the system control unit 109 sets a predetermined threshold VSC with respect to the voltage of the battery 106 detected by the remaining amount detection unit 108, and the process 500 proceeds to step S523.

In step S523, the system control unit 109 compares the voltage of the battery 106 acquired from the remaining amount detection unit 108 with the predetermined threshold VSC. In step S523, if the voltage of the battery 106 is greater than the predetermined threshold VSC, the process 500 proceeds to step S525, and if the voltage is less than or equal to the predetermined threshold VSC, the process 500 proceeds to step S524.

In step S524, the system control unit 109 performs a warning display, and the process 500 proceeds to step S525. In the warning display, a message or the like is displayed on the display unit 110 to notify the user that, if the power supplied from the source device is changed to 7.5 W (5V@1.5 Å), the moving image mode currently in operation is going to be unavailable and the operation will end.

In step S525, the system control unit 109 communicates with the internal communication unit 104, and, in accordance with the USB control unit 101, determines whether charging of the battery 106 is complete. If the system control unit 109 determines in step S525 that charging of the battery 106 is complete (YES in step S525), the process 500 proceeds to step S526.

In step S526, the system control unit 109 changes the icon to be displayed on the display unit 110 from the fifth icon 306 to the first icon 301 without changing the sixth icon 307, and the process 500 proceeds to step S509.

If the system control unit 109 determines in step S525 that charging of the battery 106 is not complete (NO in step S525), the process 500 proceeds to step S527.

In step S527, the power control unit 105 determines whether or not the PD communication unit 103 has received a change notification indicating a change in the power supply capability of the source device from the source device. In step S527, when the power control unit 105 has received a change notification from the source device (YES in step S527), the process 500 proceeds to step S510, and when the power control unit 105 has not received a change notification (NO in step S527), the process 500 returns to step S521.

Next, referring to FIGS. 6A and 6B, the process 600 performed when the electronic device 100 receives power supply of 15 W (5V@3 Å) from the source device will be described. Since the process 600 of FIGS. 6A and 6B is the same as the process 500 of FIGS. 5A and 5B when 27 W (9V@3 Å) is replaced with 15 W (5V@3 Å), description will be given for where the process 600 differs from the process 500 of FIGS. 5A and 5B. Since processes of step S601 to step S610 in the process 600 are the same as the processes of step S501 to step S510 in the process 500, the explanation thereof are omitted.

In step S611 the USB control unit 101 determines the power supply capability of the source device in accordance with the power supply capability information acquired in step S610. If the power supply capability of the source device is 27 W (9V@3 Å), the process 600 proceeds to step S612. If the power supply capability of the source device is 7.5 W (5V@1.5 Å), the process 600 proceeds to step S614.

In step S612, the USB control unit 101 requests the PD communication unit 103 to supply power of 27 W (9V@3 Å) to the source device, and the process 600 proceeds to step S613.

In step S613, when the USB control unit 101 receives, via the PD communication unit 103, a response from the source device indicating that the source device will start supplying power of 27 W (9V@3 Å), the USB control unit 101 confirms that power is supplied from the source device, and then the process 500 in FIGS. 5A and 5B will begin.

Since processes of step S614 to step S617 in the process 600 are the same as the processes of step S514 to step S517 in the process 500, the explanation thereof are omitted.

Next, referring to FIG. 7, the process 700 performed when the electronic device 100 receives power supply of 7.5 W (5V@1.5 Å) from the source device will be described.

In step S701, the system control unit 109 determines the operation mode of the electronic device 100, and in the case of the first operation mode, the process 700 proceeds to step S702, and in the case of the second operation mode, the process 700 proceeds to step S707. When the electronic device 100 acts as a digital camera, the first operation mode is the moving image mode and the second operation mode is the still image mode.

In step S702, the system control unit 109 sets a predetermined threshold VLB with respect to the voltage of the battery 106 detected by the remaining amount detection unit 108, and compares the voltage of the battery 106 that is acquired from the remaining amount detection unit 108 with the predetermined threshold VLB. In step S702, if the voltage of the battery 106 is greater than the predetermined threshold VLB (YES in step S702), the process 700 proceeds to step S704, and if the voltage is equal to or lower than the predetermined threshold VLB (NO in step S702), the process 700 proceeds to step S703. When the electronic device 100 is in the "power supply+discharge" state, the value of the predetermined threshold VLB is a value at which the operation of the electronic device 100 cannot be maintained when the voltage of the battery 106 falls below the predetermined threshold VLB.

In step S703, the system control unit 109 performs a process to shutdown the electronic device 100, and displays the fourth icon 304 on the display unit 110. Note that charging may be performed after the shutdown in step S703.

In step S704, the system control unit 109 determines the voltage of the battery 106 by comparing the voltage of the battery 106 acquired from the remaining amount detection unit 108 with the predetermined threshold VLB. The system control unit 109 displays one of the icons 301 to 303 according to the voltage of the battery 106 determined in step S704 as well as the sixth icon 307 on the display unit 110, and the process 700 proceeds to step S705.

In step S705, the system control unit 109 starts operation in accordance with the operation mode of the electronic device 100, and the process 700 proceeds to step S706. When the electronic device 100 acts as a digital camera, the operation mode of the electronic device 100 is the moving image mode.

In step S707, the system control unit 109 displays any one of the icons 301 to 303 according to the voltage of the battery 106 acquired from the remaining amount detection unit 108, as well as the sixth icon 307 on the display unit 110, and the process 700 proceeds to step S708.

In step S708, the system control unit 109 starts operation in accordance with the operation mode of the electronic device 100, and the process 700 proceeds to step S706.

When the electronic device 100 acts as a digital camera, the operation mode of the electronic device 100 is the still image mode.

In step S706, the power control unit 105 determines whether or not the PD communication unit 103 has received a change notification indicating a change in the power supply capability of the source device from the source device. In step S706, when the power control unit 105 has received a change notification from the source device (YES in step S706), the process 700 proceeds to step S709, and when the power control unit 105 has not received a change notification (NO in step S706), the process 700 returns to step S701.

In step S709, the USB control unit 101 performs communication with the source device in accordance with the PD communication unit 103, and acquires power supply capability information indicating the power supply capability of the source device, and the process 700 proceeds to step S710.

In step S710 the system control unit 109 determines the power supply capability of the source device in accordance with the power supply capability information acquired in step S709. If the power supply capability of the source device is 27 W (9V@3 Å), the process 700 proceeds to step S711. If the power supply capability of the source device is 15 W (5V@3 Å), the process 700 proceeds to step S713.

In step S711, the USB control unit 101 requests the PD communication unit 103 to supply power of 27 W (9V@3 Å) to the source device, and the process 700 proceeds to step S712.

In step S712, when the USB control unit 101 receives, via the PD communication unit 103, a response from the source device indicating that the source device will start supplying power of 27 W (9V@3 Å), the USB control unit 101 confirms that power is supplied from the source device, and the process 500 shown in FIGS. 5A and 5B will begin.

In step S713, the USB control unit 101 requests the PD communication unit 103 to supply power of 15 W (5V@3 Å) to the source device, and the process 700 proceeds to step S714.

In step S714, when the USB control unit 101 receives, via the PD communication unit 103, a response from the source device indicating that the source device will start supplying power of 15 W (5V@3 Å), the USB control unit 101 confirms that power is supplied from the source device, and then the process 600 shown in FIGS. 6A and 6B will begin.

As described above, according to the first embodiment, when power supplied from the source device changes, it is determined whether or not the operation of the electronic device 100 can be maintained by power supplied from the source device and power supplied from the battery 106, and the result of the determination is notified. In particular, when power supplied from the source device changes in a decreasing direction during power supply, a notification that the operation of the electronic device 100 cannot be maintained is made, and an end process can be performed normally.

Note that embodiments of the present invention are not limited to the first embodiment described above. A first embodiment that is changed or modified within a scope that does not departing from the gist of the invention is also included in the embodiments of the present invention.

Second Embodiment

Various kinds of functions, processes, or methods described in the first embodiment can also be realized by a personal computer, a microcomputer, a CPU (Central Processing Unit), or the like with a program. In a second embodiment, a personal computer, a microcomputer, a CPU, or the like will be called a "computer X" below. Also, in the second embodiment, a program for controlling the computer X and realizing various kinds of functions, processes, or methods described in the first embodiment will be called a "program Y".

Various kinds of functions, processes, or methods described in the first embodiment are realized by the computer X executing the program Y. In this case, the program Y is supplied to the computer X via a computer-readable storage medium. The computer-readable storage medium according to the second embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the second embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2018-245373, filed Dec. 27, 2018, which is hereby incorporated by reference herein in its entirety.

What is claimed is:

1. An electronic device comprising:
   a control circuitry that determines whether or not a voltage of a battery is greater than a predetermined threshold before a power supply capability of the electronic device is changed from a first power supply capability to a second power supply capability lower than the first power supply capability, and changes the power supply capability from the first power supply capability to the second power supply capability if the voltage of the battery is not greater than the predetermined threshold, in a case where an operation mode of the electronic device is a first operation mode different from a second operation mode; and
   a display device that displays information indicating that the first operation mode is going to be unavailable if the power supply capability of the electronic device is changed to the second power supply capability lower than the first power supply capability, in a case where the operation mode of the electronic device is the first operation mode and the voltage of the battery is not greater than the predetermined threshold,
   wherein the first operation mode is a moving image mode, and the second operation mode is a still image mode.

2. The electronic device according to claim 1, wherein the display device further displays information indicating a remaining amount of the battery, information indicating that the battery is charging, or information prompting a user to charge the battery.

3. The electronic device according to claim 1, wherein the control circuitry performs a process to shutdown the electronic device, in a case where the operation mode of the electronic device is the first operation mode, the voltage of the battery is not greater than the predetermined threshold, and the power supply capability of the electronic device is changed to the second power supply capability lower than the first power supply capability.

4. The electronic device according to claim 1, further comprising an interface unit that includes a first terminal that receives power supplied from an external device to the electronic device, and a second terminal that receives information relating to the power supply capability of the external device.

5. The electronic device according to claim 1, wherein the electronic device is a device that supports Universal Serial Bus Power Delivery standard.

6. The electronic device according to claim 1, wherein the electronic device is capable of acting as a digital camera.

7. The electronic device according to claim 1, wherein the electronic device is capable of acting as a mobile phone.

8. The electronic device according to claim 1, wherein the electronic device is capable of acting as a mobile terminal.

9. A method comprising:
   determining whether or not a voltage of a battery is greater than a predetermined threshold before a power supply capability of an electronic device is changed from a first power supply capability to a second power supply capability lower than the first power supply capability,
   changing the power supply capability from the first power supply capability to the second power supply capability if the voltage of the battery is not greater than the predetermined threshold, in a case where an operation mode of the electronic device is a first operation mode different from a second operation mode; and
   displaying information indicating that the first operation mode is going to be unavailable if the power supply capability of the electronic device is changed to the second power supply capability lower than the first power supply capability, in a case where the operation mode of the electronic device is the first operation mode and the voltage of the battery is not greater than the predetermined threshold,
   wherein the first operation mode is a moving image mode, and the second operation mode is a still image mode.

10. The method according to claim 9, further comprising displaying information indicating a remaining amount of the battery, information indicating that the battery is charging, or information prompting a user to charge the battery.

11. The method according to claim 9, further comprising performing a process to shutdown the electronic device, in a case where the operation mode of the electronic device is the first operation mode, the voltage of the battery is not greater than the predetermined threshold, and the power supply capability of the electronic device is changed to the second power supply capability lower than the first power supply capability.

12. The method according to claim 9, wherein the electronic device comprises an interface unit that includes a first terminal that receives power supplied from an external device to the electronic device, and a second terminal that receives information relating to the power supply capability of the external device.

13. The method according to claim 9, wherein the electronic device is a device that supports Universal Serial Bus Power Delivery standard.

14. The method according to claim 9, wherein the electronic device is capable of acting as a digital camera.

15. The method according to claim 9, wherein the electronic device is capable of acting as a mobile phone.

16. The method according to claim 9, wherein the electronic device is capable of acting as a mobile terminal.

17. A non-transitory storage medium that stores a program causing a computer to execute a method, the method comprising:

determining whether or not a voltage of a battery is greater than a predetermined threshold before a power supply capability of an electronic device is changed from a first power supply capability to a second power supply capability lower than the first power supply capability, changing the power supply capability from the first power supply capability to the second power supply capability if the voltage of the battery is not greater than the predetermined threshold, in a case where an operation mode of the electronic device is a first operation mode different from a second operation mode; and displaying information indicating that the first operation mode is going to be unavailable if the power supply capability of the electronic device is changed to the second power supply capability lower than the first power supply capability, in a case where the operation mode of the electronic device is the first operation mode and the voltage of the battery is not greater than the predetermined threshold, wherein the first operation mode is a moving image mode, and the second operation mode is a still image mode.

* * * * *